United States Patent [19]

Oba et al.

[11] Patent Number: 4,761,454

[45] Date of Patent: Aug. 2, 1988

[54] METHOD FOR THE PREPARATION OF FINE SPHERICAL PARTICLES OF SILICONE ELASTOMER

[75] Inventors: Toshio Oba, Annaka; Takeshi Mihama, Tokyo; Koji Futatsumori, Annaka, all of Japan

[73] Assignee: Shin-Etsu Chemical Co., Ltd., Tokyo, Japan

[21] Appl. No.: 44,236

[22] Filed: Apr. 30, 1987

[30] Foreign Application Priority Data

May 2, 1986 [JP] Japan .................................. 61-102285

[51] Int. Cl.$^4$ .............................................. C08L 83/04
[52] U.S. Cl. ...................................... 524/862; 524/588; 524/861; 528/15; 528/31; 528/32; 525/478
[58] Field of Search ....................... 524/588, 861, 862; 528/15, 31, 32; 525/478

[56] References Cited

U.S. PATENT DOCUMENTS

| | | | |
|---|---|---|---|
| 4,433,007 | 2/1984 | Marwitz et al. | 524/588 |
| 4,594,134 | 6/1986 | Hanada et al. | 528/15 |
| 4,663,397 | 5/1987 | Morita et al. | 525/398 |

Primary Examiner—Melvyn I. Marquis
Attorney, Agent, or Firm—Hopgood, Calimafde, Kalil, Blaustein & Judlowe

[57] ABSTRACT

Fine spherical particles of cured silicone elastomer can be prepared by spray-drying an aqueous emulsion of a curable organopolysiloxane composition having a particle diameter not exceeding 20 μm. The organopolysiloxane composition comprises preferably an organopolysiloxane having silicon-bonded vinyl groups, an organohydrogenpolysiloxane having silicon-bonded hydrogen atoms and a platinum catalyst so that curing of the composition may take place in the emulsion before spray-drying or in the course of spray-drying by the addition reaction between the silicon-bonded vinyl groups and the silicon-bonded hydrogen atoms.

5 Claims, No Drawings

1

METHOD FOR THE PREPARATION OF FINE SPHERICAL PARTICLES OF SILICONE ELASTOMER

BACKGROUND OF THE INVENTION

The present invention relates to a method for the preparation of fine spherical particles of a silicone elastomer useful as an additive in thermoplastic and thermosetting resins for improving the impact strength of the resin, lubricity improver or anti-blocking agent in paints, filler in cosmetic preparations and so on.

Several proposals have been made in the prior art on a silicone elastomer composition loaded with fine particles of a silicone elastomer. For example, a heat-curable epoxy resin composition is disclosed in Japanese Patent Kokai No. 59-96122, according to which an epoxy resin is blended with a composition containing spherical particles of an organopolysiloxane elastomer cured by heating in the presence of an organic peroxide. The spherical particles of the silicone elastomer are obtained by spray-drying a curable organopolysiloxane composition at a temperature of 230° to 300 ° C. This method has several problems and disadvantages. For example, the lower limit of the diameter of the thus obtained particles cannot be smaller than the diameter of the droplets of the curable organopolysiloxane composition formed by spraying so that the average particle diameter thereof can rarely be smaller than 100 $\mu$m without subsequent pulverization. In addition, it is sometimes difficult to adequately control the curing velocity of the composition since the curing reaction must proceed during the period in which the droplets formed by spraying fall within the spray chamber.

SUMMARY OF THE INVENTION

The present invention accordingly has an object to provide a method for the preparation of fine spherical particles of a silicone elastomer free from the above described problems and disadvantages in the prior art. The method of the present invention comprises spray-drying an aqueous emulsion containing a curable or, preferably, cured organopolysiloxane composition dispersed in an aqueous medium in the form of spherical particles having a diameter not exceeding 20 $\mu$m. In particular, the organopolysiloxane composition should preferably comprise (a) an organopolysiloxane having, in a molecule, at least two vinyl groups bonded to the silicon atoms, (b) an organohydrogenpolysiloxane having, in a molecule, at least two hydrogen atoms directly bonded to the silicon atoms and (c) a platinum compound in a catalytic amount.

DETAILED DESCRIPTION OF THE PREFERRED EMBODIMENTS

As is described in the above given summary of the invention, the characteristic feature of the inventive method consists in spray-drying of an aqueous emulsion containing a curable or cured organopolysiloxane composition which preferably comprises an organopolysiloxane having silicon-bonded vinyl groups, an organohydrogenpolysiloxane and a platinum catalyst to promote the addition reaction between the silicon-bonded vinyl groups and the silicon-bonded hydrogen atoms.

An aqueous emulsion of such an organopolysiloxane composition per se is known in the prior art. For example, Japanese Patent Kokai No. 56-36546 teaches an aqueous emulsion in which the organopolysiloxane composition as the disperse phase has been cured by heating into a rubbery elastomer. The intended application of the aqueous emulsion, however, is as a coating agent of various substrate materials on which the coating layer of the emulsion is formed and dried by evaporating water to give a coating film of a silicone rubber.

It is also known that silicone rubber particles can be obtained when the dispersed particles of the organopolysiloxane composition are precipitated by the addition of a water-soluble salt or alcohol to the emulsion followed by separation from the aqueous medium, washing with water and drying. This method, however, is not quite satisfactory in respect of the disintegrability of the dried powder into individual discrete particles and sphericity of the particles as a result of agglomeration and coalescence of the particles taking place in the course of processing.

In contrast to the above described conventional method, quite satisfactory results can be obtained in respect of the disintegrability of the powder and sphericity of the particles only when the particles of the organopolysiloxane composition dispersed in the aqueous medium of the emulsion by use of a surface active agent have an average particle diameter not exceeding 20 $\mu$m and the particles are separated from the aqueous medium by spray-drying.

Although the organopolysiloxane composition as the disperse phase in the aqueous emulsion may be any of known ones, it is preferable that the composition comprises (a) an organopolysiloxane having silicon-bonded vinyl groups, (b) an organohydrogenpolysiloxane and (c) a platinum catalyst so that the curing reaction takes place between the silicon-bonded vinyl groups and the silicon-bonded hydrogen atoms in the presence of the platinum catalyst.

The component (a) in the organopolysiloxane composition should have at least two vinyl groups directly bonded to the silicon atoms in a molecule. In other respects, the organopolysiloxane is not particularly limitative in the types of the siloxane units forming the polysiloxane structure. For example, the organopolysiloxane may be formed by one kind or combination of two kinds or more of the units including the trifunctional siloxane units of the formulas $(CH_2=CH)SiO_{1.5}$ and $RSiO_{1.5}$, difunctional units of the formulas $(CH_2=CH)RSiO$, $(CH_2=CH)_2SiO$ and $R_2SiO$, and monofunctional units of the formulas $(CH_2=CH)R_2SiO_{0.5}$, $(CH_2=CH)_2RSiO_{0.5}$, $(CH_2=CH)_3SiO_{0.5}$ and $R_3SiO_{0.5}$, in which R is a monovalent hydrocarbon group other than vinyl exemplified by alkyl groups, e.g. methyl, ethyl, propyl and butyl groups, aryl groups, e.g. phenyl and tolyl groups, and cycloalkyl groups, e.g. cyclohexyl group, as well as those substituted groups obtained by replacing a part or all of the hydrogen atoms in the above named hydrocarbon groups with substituent atoms and/or groups such as halogen atoms and cyano groups.

The molecular structure of the organopolysiloxane is also not particularly limitative including straightly linear, branched chain-like and cyclic ones although the organopolysiloxane should preferably be a diorganopolysiloxane having a substantially linear molecular structure and an average degree of polymerization in the range from 40 to 1000 in view of the rubbery elasticity of the cured composition. Each terminal group of the diorganopolysiloxane is preferably a dimethyl vinyl silyl group to provide the vinyl groups at the molecular chain ends but the silicon atoms at any intermediate positions of the polysiloxane chain may have vinyl groups bonded thereto. The organopolysiloxane should have vinyl groups in an amount of at least 0.1% by moles based on the overall number of the silicon atoms. It is also preferable that at least 50% by moles of the organic groups bonded to the silicon atoms in the diorganopolysiloxane molecules are methyl groups.

Following are the formulas representing typical diorganopolysiloxanes suitable as the component (a) in the organopolysiloxane composition, in which the symbols Me and Vi denote methyl and vinyl groups, respectively, and the subscripts p, m and n are each a positive integer of 10 to 600, 10 to 1000 and 2 to 50, respectively:

Vi—SiMe$_2$—O—(SiMe$_2$—O)$_p$SiMe$_2$Vi; and

Me$_3$Si—O—(SiMe$_2$—O)$_m$SiMeVi—)$_n$SiMe$_3$.

The component (b) in the organopolysiloxane composition is an organohydrogenpolysiloxane which should have at least two hydrogen atoms directly bonded to the silicon atoms in a molecule. The organohydrogenpolysiloxane is formed of a combination of two kinds or more of the siloxane units including those expressed by the formulas HSiO$_{1.5}$, RSiO$_{1.5}$, RHSiO, R$_2$SiO, R$_2$HSiO$_{0.5}$ and R$_3$SiO$_{0.5}$, in which R has the same meaning as defined above for the component (a). The molecular structure thereof also may be straightly linear, branched chain-like or cyclic with preference of the straightly linear molecular structure. The silicon atoms having hydrogen atoms directly bonded thereto are usually positioned at the intermediate positions of such a linear polysiloxane structure although the terminal silicon atoms also may have silicon-bonded hydrogen atoms. It is preferable that at least 3% by moles of the silicon atoms should have silicon-bonded hydrogen atoms and at least 50% by moles of the organic groups bonded to the silicon atoms should be methyl groups. A typical molecular formula representing such an organohydrogenpolysiloxane is as follows, in which the subscript q is zero or a positive integer not exceeding 200 and the subscript r is a positive integer of 8 to 100:

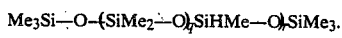

Me$_3$Si—O—(SiMe$_2$—O)$_q$SiHMe—O)$_r$SiMe$_3$.

The compound as the component (c) is a catalyst which serves to promote the addition reaction, i.e. hydrosilation, between the silicon-bonded vinyl groups in the component (a) and the silicon-bonded hydrogen atoms in the component (b). Various kinds of known platinum materials can be used as the catalyst including platinum black, platinum catalysts supported on a carrier such as silica gel, chloroplatinic acid unmodified or modified with an alcohol, complexes of chloroplatinic acid with an aldehyde, olefin, vinyl siloxane and the like, and others.

The organopolysiloxane composition as the disperse phase in the emulsion used in the inventive method can be prepared by blending the components (a), (b) and (c) in a suitable proportion. For example, the compounding ratio of the components (a) and (b) can be varied in a wide range depending on the molecular weight or mechanical properties required for the elastomer as a cured product of the composition. It is usually preferable that the molar ratio of the silicon-bonded vinyl groups in the component (a) to the silicon-bonded hydrogen atoms in the component (b) is in the range from 4:1 to 1:4. The amount of the platinum catalyst as the component (c) may be a so-called catalytic amount. For example, the amount thereof calculated as platinum should be in the range from 0.1 to 1000 ppm by weight or, preferably, from 1 to 100 ppm by weight based on the total amount of the components (a) and (b). When the amount of the platinum catalyst is too small, the velocity of the addition reaction between the components (a) and (b) would be too low. When the amount thereof is too large, the reaction velocity would be too high to cause some difficulty in controlling the reaction if not to mention the economical disadvantage due to the expensiveness of the platinum compound.

In practicing the inventive method by using the above described organopolysiloxane composition curable by the mechanism of the addition reaction, the first step is the preparation of the organopolysiloxane composition by blending the vinyl-containing organopolysiloxane as the component (a) and the organohydrogenpolysiloxane as the component (b) each in a calculated amount. The composition is then added to a calculated volume of water containing a surface active agent and emulsified therein by vigorous agitation using a mixer such as a homogenizer. Although the type of the surface active agent is not particularly limitative, it should preferably be a non-ionic surface active agent having an HLB value of 10 to 15 such as polyoxyethylene alkyl phenyl ethers and polyoxyethylene alkyl ethers. Two kinds or more of surface active agents may be used in combination, if necessary. The emulsification of the organopolysiloxane composition should be so complete that the emulsified particles should have a particle diameter not exceeding 20 μm. In this regard, a preferable way of emulsification is the so-called phase-inversion emulsification in which water is slowly added to the organopolysiloxane composition of the components (a) and (b) admixed beforehand with the surface active agent under agitation so that phase inversion takes place from the water-in-oil emulsion to the oil-in-water emulsion. The amount of water necessary for the phase inversion is in the range from 10 to 50 parts by weight per 100 parts by weight of the organopolysiloxane composition. The platinum catalyst is then added to the thus prepared emulsion, if necessary, together with a reaction moderator. When the platinum compound is hardly dispersible in water, it may be dispersed in a small volume of water in advance using a surface active agent.

The curing reaction of the organopolysiloxane thus dispersed in an aqueous medium may be performed either before the step of spray-drying of the emulsion by heating the emulsion, for example, at 50° C. for 6 hours or in the course of the spray-drying of the emulsion with heating. The spray chamber for the spray-drying of the emulsion should be controlled so that the temperature at the inlet is in the range from 100° to 200° C. and the temperature at the outlet is in the range from 60° to 100° C. in order to have the particles fully cured when they are accumulated in the chamber. Though dependent on the material of the apparatus for the spray-drying, it is sometimes advisable that the aqueous emulsion is admixed with a rust inhibitor in addition to other optional additives such as preservatives, i.e. antiseptic agents, coloring agents, i.e. dyes and pigments, and the like.

When the particle diameter of the emulsified organopolysiloxane composition is 20 μm or smaller, the spherical particles of the silicone elastomer obtained by spray-drying of the emulsion also have a particle diameter of 20 μm or smaller. Coarser particle diameters than 20 μm of the emulsified particles may result in a decrease in the stability of the emulsion eventually to cause destruction of the emulsion and separation of the organopolysiloxane composition from the aqueous medium. The thus obtained powder of the silicone elastomer usually has a bulk density in the range from 0.1 to 0.3 g/cm$^3$ and the particles thereof have a good sphericity in configuration. The particles are free from the trouble of self-bonding unless curing of the organopolysiloxane composition is incomplete. Being a cured product of a rubbery organopolysiloxane composition, the particles naturally have rubbery elasticity and excellent lubricity. Therefore, the powder of silicone elastomer obtained by the inventive method is useful as a filling material in thermoplastic and thermosetting resins to impart them with improved impact resistance and lubricity as well as a blocking inhibitor in coating compositions and an additive in cosmetic preparations.

In the following, the method of the present invention is described in more detail by way of examples, in which the term of "parts" always refers to "parts by weight" and the values of viscosity are all those obtained by the measurement at 25° C.

EXAMPLE 1

An organopolysiloxane composition was prepared by blending 100 parts of a methyl vinyl polysiloxane having a viscosity of 200 centistokes composed of 96% by moles of dimethyl siloxane units and 4% by moles of methyl vinyl siloxane units and terminated at each molecular chain end with a dimethyl vinyl silyl group and 10 parts of a methyl hydrogen polysiloxane having a viscosity of 28 centistokes composed of 95% by moles of methyl hydrogen siloxane units and 5% by moles of dimethyl siloxane units and terminated at each molecular chain end with a trimethyl silyl group. The blending ratio corresponded to 2.0 moles of the silicon-bonded hydrogen atoms in the methyl hydrogen polysiloxane per mole of the vinyl groups in the methyl vinyl polysiloxane.

The organopolysiloxane composition in an amount of 110 parts was admixed with 587 parts of water and 3 parts of a polyoxyethylene octyl phenyl ether having an HLB value of 13.5 and then emulsified first by agitating with a homogenizer and then by passing once through a Gaulin homogenizer under a pressure of 300 kg/cm$^2$ to give a homogenized emulsion. The particles of this emulsion had a maximum particle diameter of 1.2 μm with a volume-average particle diameter of 1.0 μm.

Separately, a catalyst mixture was prepared by mixing a 0.5 part portion of the thus prepared emulsion and a complex of chloroplatinic acid and an olefin in an amount of 0.06 part as platinum and the emulsion was admixed with this catalyst mixture and kept standing at 25° C. for 20 hours to effect the curing reaction of the organopolysiloxane composition. The particle diameter in the emulsion was unaltered by this curing reaction with the volume-average particle diameter of 1.0 μm.

The emulsion was then subjected to spray-drying in a spray drier controlled to have a temperature of 150° C. at the inlet and 80° C. at the outlet. The amount of the powder silicone elastomer accumulated in the spray chamber was 90.5 parts corresponding to 83% of the feed of organopolysiloxane composition and the amount thereof accumnulated in the bag filter was 12 parts corresponding to 11% of the feed. The former portion of the product in the spray chamber, of which the particles had good sphericity, was free from the phenomenon of self-bonding and had a maximum particle diameter of 15 μm indicating some agglomeration of the particles with a bulk density of 0.13 g/cm$^3$ and a moisture content of 0.6% while the latter portion of the product in the bag filter had a maximum particle diameter of 2 μm.

EXAMPLE 2

An organopolysiloxane composition was prepared by blending 100 parts of a methyl vinyl polysiloxane having a viscosity of 600 centistokes composed of dimethyl siloxane units alone excepting the terminal units and terminated at each molecular chain end with a dimethyl vinyl silyl group and 2.5 parts of a resinous methyl hydrogen polysiloxane composed of 60% by moles of monofunctional dimethyl hydrogen siloxane units of the formula $(CH_3)_2HSiO_{0.5}$ and 40% by moles of tetrafunctional siloxane units of the formula $SiO_2$. The blending ratio corresponded to 1.5 moles of the silicon-bonded hydrogen atoms in the methyl hydrogen polysiloxane per mole of the vinyl groups in the methyl vinyl polysiloxane.

The organopolysiloxane composition was emulsified in the same manner as in Example 1 by admixing water and the same surface active agent followed by dispersing with a homogenizer and emulsifying with a Gaulin homogenizer. The particles of the emulsion had a maximum particle diameter of 1.2 μm with a volume-average particle diameter of 0.9 μm.

The emulsion was further admixed with the platinum catalyst in the same manner as in Example 1 and heated at 50° C. for 6 hours to effect the curing reaction of the organopolysiloxane composition. The volume-average particle diameter in the emulsion was slightly increased to 1.1 μm after curing. The emulsion was spray-dried in the same manner as in Example 1 to give fine particles of silicone elastomer accumulated in the spray chamber and in the bag filter. The amount of the powder of silicone elastomer accumulated in the spray chamber was 80 parts corresponding to 76% of the feed of organopolysiloxane composition and the amount thereof accumulated in the bag filter was 18 parts corresponding to 17% of the feed. The former portion of the product in the spray chamber, of which the particles had good sphericity, was free from the phenomenon of self-bonding and had a maximum particle diameter of 15 μm with a bulk density of 0.2 g/cm$^3$ and a moisture content of 0.4% while the latter portion of the product in the bag filter had a maximum particle diameter of 2 μm.

COMPARATIVE EXAMPLE

A 100 parts portion of the aqueous emulsion prepared in Example 2 after admixture of the platinum catalyst was heated at 50° C. for 6 hours to effect curing of the organopolysiloxane composition and then 100 parts of isopropyl alcohol were added thereto to destroy the emulsion and separate the cured organopolysiloxane composition, which was freed from the aqueous medium and dried. The thus obtained silicone elastomer was in a non-spherical lumpy form having dimensions of 2 to 50 mm.

What is claimed is:

1. A method for the preparation of fine spherical particles of a silicone elastomer which comprises spray-drying an aqueous emulsion containing a curable organopolysiloxane composition dispersed in an aqueous medium in the form of spherical particles having a diameter not exceeding 20 μm, wherein the organopolysiloxane composition comprises:
   (a) an organopolysiloxane having, in a molecule, at least two vinyl groups bonded to the silicon atoms;
   (b) an organohydrogenpolysiloxane having, in a molecule, at least two hydrogen atoms directly bonded to the silicon atoms; and
   (c) a platinum compound in a catalytic amount.

2. The method for the preparation of fine spherical particles of a silicone elastomer as claimed in claim 1 wherein the aqueous emulsion containing a curable organopolysiloxane composition is prepared by the steps comprising:
   (i) mixing (a) an organopolysiloxane having, in a molecule, at least two vinyl groups bonded to the silicon atoms and (b) an organohydrogenpolysiloxane having, in a molecule, at least two hydrogen atoms directly bonded to the silicon atoms to give an organopolysiloxane composition;
   (ii) dispersing the organopolysiloxane composition in an aqueous medium containing a surface active agent to give an aqueous emulsion, of which the particle diameter of the dispersed organopolysiloxane composition is 20 μm or smaller; and
   (iii) admixing the aqueous emulsion with (c) a platinum compound in a catalytic amount.

3. The method for the preparation of fine spherical particles of a silicone elastomer as claimed in claim 1 wherein the curable organopolysiloxane composition in the aqueous emulsion is cured prior to spray-drying.

4. The method for the preparation of fine spherical particles of a silicone elastomer as claimed in claim 2 wherein the surface active agent is a non-ionic surface active agent having an HLB value in the range from 10 to 15.

5. The method for the preparation of fine spherical particles of a silicone elastomer as claimed in claim 2 wherein the step (ii) for the preparation of the aqueous emulsion is performed by introducing water to the organopolysiloxane composition in such an amount that the water-in-oil emulsion at the initial stage of addition of water is converted to an oil-in-water emulsion by phase inversion.

* * * * *